United States Patent
Conchieri et al.

(10) Patent No.: US 9,771,864 B2
(45) Date of Patent: Sep. 26, 2017

(54) GAS TURBINE COMPRESSOR INLET PRESSURIZATION AND FLOW CONTROL SYSTEM

(75) Inventors: John Anthony Conchieri, Greenfield Center, NY (US); Robert Thomas Thatcher, Greer, SC (US); Andrew Mitchell Rodwell, Greenville, SC (US)

(73) Assignee: General Electric Company, Schenectady, NY (US)

( * ) Notice: Subject to any disclaimer, the term of this patent is extended or adjusted under 35 U.S.C. 154(b) by 1043 days.

(21) Appl. No.: 13/485,216

(22) Filed: May 31, 2012

(65) Prior Publication Data
US 2013/0318997 A1    Dec. 5, 2013

(51) Int. Cl.
F02C 6/12        (2006.01)

(52) U.S. Cl.
CPC ............... F02C 6/12 (2013.01); *Y02E 20/14* (2013.01); *Y02E 20/16* (2013.01)

(58) Field of Classification Search
CPC . Y02E 20/16; Y02E 20/14; F02C 7/04; F02C 7/057; F02C 6/18; F02C 6/12; F02C 7/143; F02C 1/007; F02C 7/18; F02C 6/06; F02C 9/18; F02C 6/08; F05D 2270/30; F05D 2270/303; F02D 41/0007; F02D 23/00; F02K 3/075
USPC .................................. 60/39.23, 726
See application file for complete search history.

(56) References Cited

U.S. PATENT DOCUMENTS

| | | | |
|---|---|---|---|
| 5,117,625 A * | 6/1992 | McArthur et al. | 60/785 |
| 5,911,679 A * | 6/1999 | Farrell | F01D 17/162 415/149.2 |
| 6,308,512 B1 | 10/2001 | Kopko | |
| 6,442,941 B1 * | 9/2002 | Anand | F02C 7/32 60/39.182 |
| 6,442,942 B1 | 9/2002 | Kopko | |
| 6,530,224 B1 | 3/2003 | Conchieri | |
| 6,606,848 B1 | 8/2003 | Rollins, III | |
| 6,718,771 B1 | 4/2004 | Kopko | |
| 6,851,265 B2 * | 2/2005 | Elwood | F02C 6/18 122/7 B |
| 6,880,343 B2 | 4/2005 | Kopko | |

(Continued)

FOREIGN PATENT DOCUMENTS

| CN | 1987066 A | 6/2007 |
|---|---|---|
| CN | 102052098 A | 5/2011 |

(Continued)

OTHER PUBLICATIONS

U.S. Appl. No. 13/485,160, filed May 31, 2012, Sanji Ekanayake.

(Continued)

*Primary Examiner* — Carlos A Rivera
*Assistant Examiner* — Stefan Ibroni
(74) *Attorney, Agent, or Firm* — Ernest G. Cusick; Frank A. Landgraff

(57) ABSTRACT

A supercharging system for a gas turbine system is provided supercharging system having a fan mechanically coupled to the turbine shaft of the turbine system. A bypass subsystem is provided or optionally conveying a portion of the airstream output to other uses. The supercharging system may also be used in conjunction with a combined cycle power system and a bypass subsystem optionally conveys a portion of the airstream output to a heat recovery steam generator.

11 Claims, 2 Drawing Sheets

(56) References Cited

U.S. PATENT DOCUMENTS

| | | | |
|---|---|---|---|
| 7,065,953 | B1 | 6/2006 | Kopko |
| 7,124,591 | B2* | 10/2006 | Baer et al. ............... 60/786 |
| 7,624,581 | B2 | 12/2009 | Moniz |
| 8,671,688 | B2* | 3/2014 | Rogers ............... F01K 13/02 60/39.182 |
| 9,003,762 | B2* | 4/2015 | Scipio ............... F01D 25/30 60/39.5 |
| 2003/0106319 | A1 | 6/2003 | Kopko |
| 2007/0137216 | A1* | 6/2007 | Joshi et al. ............... 60/791 |
| 2008/0304954 | A1* | 12/2008 | Hoffman et al. ............... 415/17 |
| 2010/0215480 | A1* | 8/2010 | Leach ............... F02C 9/18 415/145 |
| 2011/0033297 | A1* | 2/2011 | Bouru ............... 416/147 |
| 2011/0110760 | A1 | 5/2011 | Sanchez |
| 2013/0318941 | A1* | 12/2013 | Ekanayake et al. ......... 60/39.17 |
| 2013/0318965 | A1* | 12/2013 | Ekanayake et al. ......... 60/605.1 |
| 2013/0318987 | A1* | 12/2013 | Ekanayake et al. ............ 60/772 |

FOREIGN PATENT DOCUMENTS

| | | |
|---|---|---|
| EP | 2387657 A1 | 11/2011 |
| WO | 2010083126 A1 | 7/2010 |

OTHER PUBLICATIONS

U.S. Appl. No. 13/485,273, filed May 31, 2012, Sanji Ekanayake.

Brandon et al, "Inlet Air Supercharging of a 70 kW Microturbine" Proceedings of GT2006 ASME Turbo Expo 2006: Power for Land, Sea and Air May 8-11, 2006, Barcelona, Spain.

Enhanced Turbine Output LLC, 3000 connecticut Ave, suite 317, Washington DC 20008, "Summary Description of Powercool", www.etollc.com, May 20, 2004, p. 1-2.

Howden Brochure, Variax Axial Flow Fans continually setting new standards, Howden Denmark A/S, Industrivej 23, DK-4700 Naestved, Denmark, 2009, pp. 1-7, www.howden.com.

Voith Turbo, Voith Turbo GmbH & Co. KG, Jul. 12, 2002, pp. 1-20, www.Voithturbo.com.

Wang, T. and Braquet, L, "Assessment of Inlet cooling to enhance output of a fleet of gas turbines", Proceedings of the Thirtieth Industrial Energy Technology Conference, IETC 30$^{th}$, New Orleans, May 6-9, 2008.

Unofficial English Translation of Chinese Office Action issued in connection with corresponding CN Application No. 201310210431.6 on Nov. 3, 2015.

\* cited by examiner

GAS TURBINE COMPRESSOR INLET PRESSURIZATION AND FLOW CONTROL SYSTEM

CROSS-REFERENCE TO RELATED APPLICATIONS

This application is related to concurrently filed application Ser. No. 13/485,160, titled SUPERCHARGED COMBINED CYCLE SYSTEM WITH AIR FLOW BYPASS, filed jointly in the names of Sanji Ekanayake and Alston I. Scipio, and application Ser. No. 13/485,273, titled GAS TURBINE COMPRESSOR INLET PRESSURIZATION HAVING A TORQUE CONVERTER SYSTEM, filed jointly in the names of Sanji Ekanayake and Alston I. Scipio, each assigned to General Electric Company, the assignee of the present invention.

TECHNICAL FIELD

The subject matter disclosed herein relates generally to gas turbine systems and more specifically to a gas turbine system with compressor inlet pressurization and a flow control system.

BACKGROUND

Utility power producers use combined cycle systems because of their inherent high efficiencies and installed cost advantage. Combined cycle systems typically include a gas turbine, heat recovery steam generators, generators, controls, and a steam turbine. Combined cycle systems use the hot exhaust gas from gas turbines to make steam, which drives a steam turbine. The combination of a gas turbine and a steam turbine achieves greater efficiency than would be possible independently. The output of a combined cycle system is affected by altitude and variations in the ambient temperature.

Various methods are available for improving the performance of combined-cycle power plants. Improvements can be made in plant output or efficiency beyond those achievable through higher steam temperatures; multiple steam-pressure levels or reheat cycles. For example, it has become commonplace to install gas fuel heating on new combined-cycle power plants to improve plant efficiency. Additionally, gas turbine inlet air cooling is sometimes considered for increasing gas turbine and combined-cycle output. Another approach is supercharging (compressor inlet pressurization). Supercharging of a gas turbine entails the addition of a fan to boost the pressure of the air entering the inlet of the compressor. Typically, in the case of supercharging, the additional stage of compression is not driven by the main gas turbine shaft, but rather by an electric motor. In some cases, the parasitic power of the fan motor is more than the additional output of the gas turbine, so the net result is a capacity loss.

BRIEF DESCRIPTION OF THE INVENTION

In accordance with one exemplary non-limiting embodiment, the invention relates to a supercharging system for a gas turbine system having a compressor, a combustor and a turbine. The supercharging system includes a fan assembly mechanically coupled to the turbine shaft and a subsystem for conveying a first portion of the air stream output of the fan to the compressor. A bypass subsystem for optionally conveying a second portion of the air stream output to other uses is also included.

In another embodiment, the gas turbine system further includes a heat recovery steam generator, and the bypass subsystem conveys the second portion of the air stream to the heat recovery steam generator.

In another embodiment, a gas turbine system includes a compressor; a combustor; a turbine; and a shaft coupled to the turbine. A fan that generates an air stream is mechanically coupled to the shaft. The gas turbine system also includes a bypass subsystem that allocates the air stream between the compressor and other uses.

In another embodiment, a method of operating a gas turbine includes providing an air stream from a fan assembly; determining a first portion of the air stream to be provided to a compressor and a second portion of the air stream to be provided to other uses; and controlling the air stream to provide the first portion of the air stream to the compressor at a desired temperature and the second portion of the air stream to the other uses.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

Figure 1:
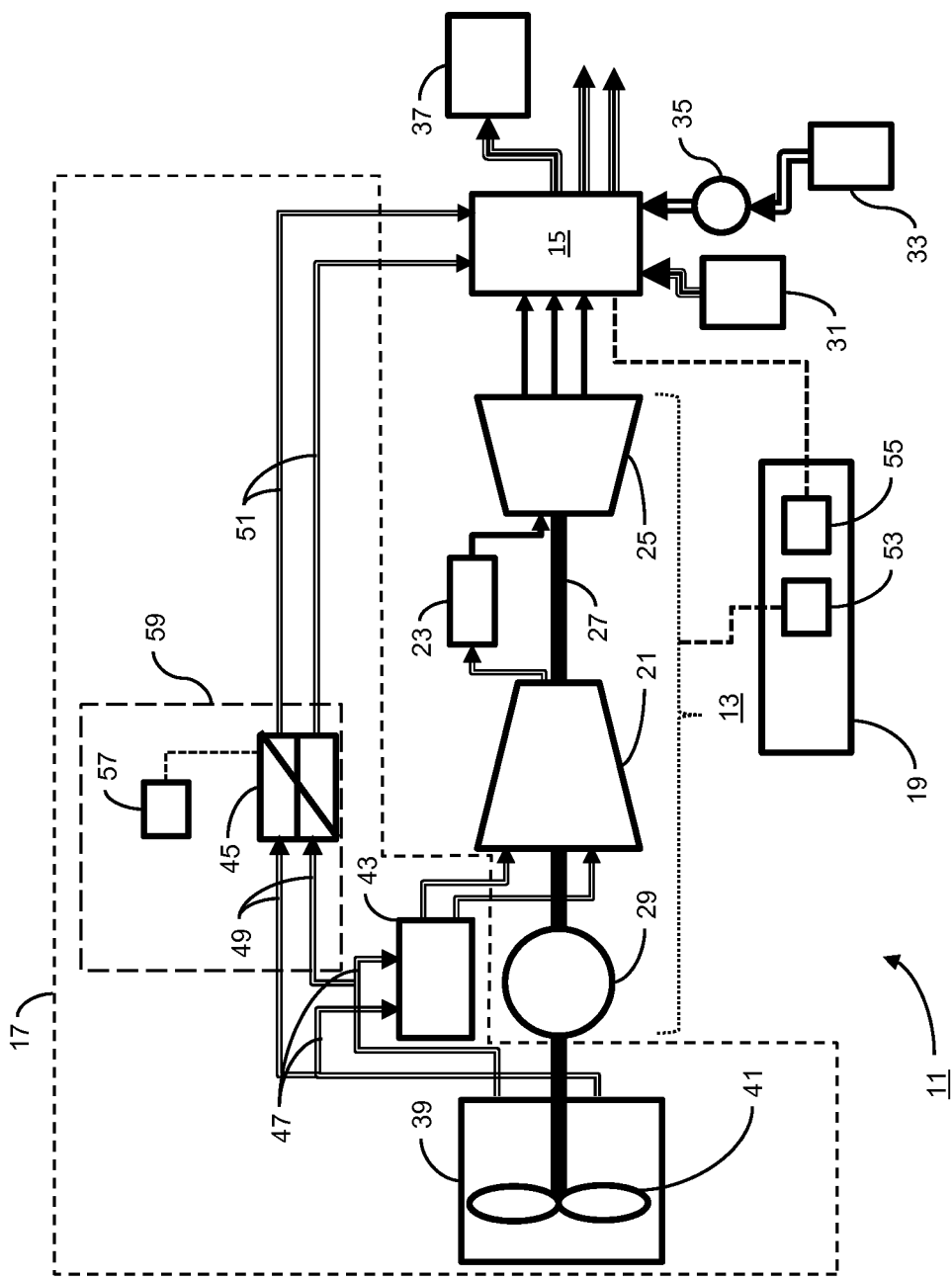
FIG. 1 is a schematic of a supercharged system.

FIG. 1 illustrates a supercharged system 11, including a gas turbine system 13, a heat recovery steam generator (HRSG system 15) a supercharger and bypass system 17, and a control system 19.

The gas turbine system 13 includes a compressor 21 coupled to a combustor 23 and a turbine 25. A shaft 27 couples the compressor 21 to the turbine 25 and may be used to drive a generator and/or mechanical load 29. Fuel and air are mixed in combustor 23 and then ignited providing energy to the gas stream from the compressor 21. The combustion exhaust is forced into the turbine 25 where the high velocity and volume of the gas flow is directed through a nozzle (not shown) over the blades (not shown) of turbine 25, rotating the turbine 25 which in turns rotates the shaft 27. Shaft 27 powers the compressor 21 and may be used to drive the generator and/or mechanical load 29.

The HRSG system 15 is a heat exchanger that recovers heat from the combustion exhaust. In some cases HRSG system 50 may be provided with additional fuel or auxiliary steam 31. The additional fuel may be used to fire a secondary combustion chamber to increase steam production rates. Water to generate steam is provided by a feed water supply 33. The supply of water may be controlled by valve 35.

The HRSG system 15 may be used to produce steam to drive an external steam host 37 such as a steam turbine. This combination of a gas turbine system 13 and the steam turbine produces electricity more efficiently than either the gas turbine or steam turbine alone. The steam generated by the HRSG may also be used in other processes, such as district heating or other process heating.

The supercharger and bypass system 17 includes a fan assembly 39 having a fan 41. Fan 41 is directly coupled to, and mechanically driven by the shaft 27 directly to operate at the same gas turbine rotational shaft speed, or indirectly through a gear or belt assembly (not shown) to run at a different speed ratio. Fan 41 may have fixed or variable pitch blades. The fan assembly 39 provides an air stream at a specific temperature and pressure.

The supercharger and bypass system 17 may include air cooling subsystem 43 to control the temperature of the air stream. The fan assembly may increase the gas turbine inlet temperature therefore air cooling subsystem 43 is necessary to avoid exceeding compressor temperature limits and high inlet volumetric flow rates. The air cooling subsystem 43 may utilize conventional chilling technologies such as mechanical chillers, media type evaporative coolers and absorption chillers.

The supercharger and bypass system 17 may also be provided with a variable geometry diverter 45 which may include a damper and a bypass duct (not shown). The variable geometry diverter 45 may be utilized to optimize both the air stream flow from the fan assembly 39 and the discharge pressure during the acceleration and power loading sequence of the gas turbine system 13. The variable geometry diverter 45 also may be used to adjust power output as a function of varying ambient conditions. The supercharger and bypass system 17 operates in conjunction with air cooling conduits 47, diverter conduits 49 and HRSG conduits 51, where HRSG conduits are uninterruptedly connected from the variable geometry diverter 45 of the bypass system 59 to the HRSG 15 as clearly illustrated in FIG. 1, to manage the amount of airflow directed to the air cooling subsystem 43 and the HRSG system 15. The air stream provided by the fan assembly 39 may be divided into a first portion to be conveyed to the air cooling subsystem 43 and a second portion to be conveyed to the HRSG system 15. Discharging air from the fan assembly 39 into the exhaust stream may be used to control the air flow from the fan assembly 39 and discharge pressure.

Control system 19 may be used to control the operation of the supercharged system 11. Control system 19 may include a turbine control subsystem 53 that controls the turbine operations an HRSG control subsystem 55 that controls the operations of the HRSG system 15. A supercharger and bypass control subsystem 57 may be provided to control the fan assembly 39 and the variable geometry diverter 45. A bypass subsystem 59 may include the diverter conduits 49, the variable geometry diverter 45 and the supercharger and bypass control subsystem 57. The turbine control subsystem 53, the HRSG control subsystem 55, and the supercharger and bypass control subsystem 57 may be part of a combined control system, or may be separate controls networked together.

It should be noted that although the embodiment illustrated in FIG. 1, shows a representative arrangement the shaft arrangement may be re-arranged. As an example, the gas turbines system may drive the generator and/or mechanical load 29 from the exhaust (turbine) end, where the diagram illustrates being driven from the compressor end. Also the gas turbine system 13, the generator and/or mechanical load 29 and the fan assembly 39 may have multiple shafts.

Figure 2:
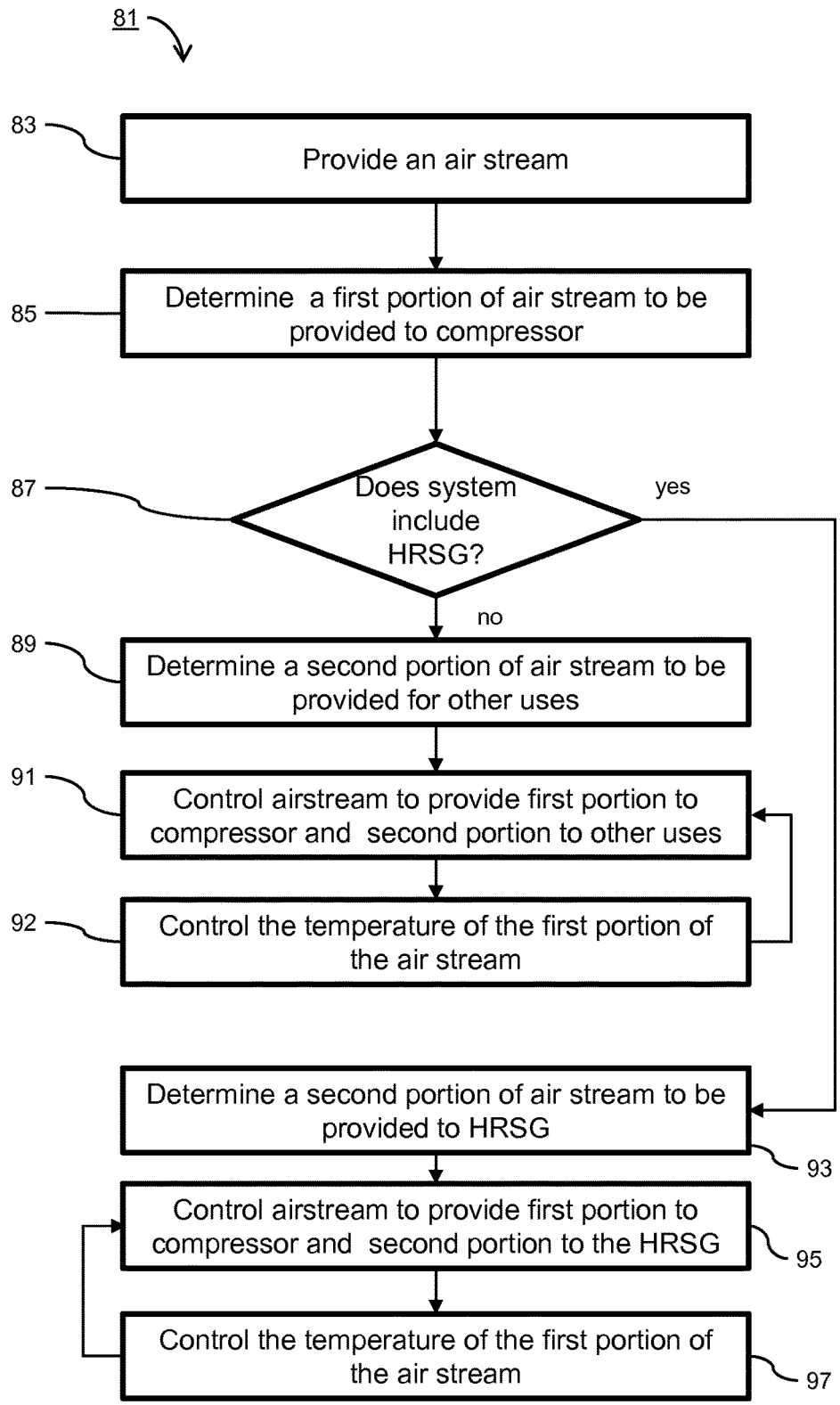
FIG. 2 is a flow chart of a method of operating a supercharged system.

FIG. 2 is a flowchart illustrating a method that may be implemented with supercharged system 11. The supercharged system 11 provides operators with a method of operating a gas turbine system (method 81) that delivers numerous advantages. At a high level, the method 81 may provide an air stream (method element 83). The method 81 may determine a first portion of the air stream to be provided to the compressor (method element 85). The first portion may be determined based on operating conditions and operating envelope for the gas turbine system 13. For example, the level of supercharging may be determined by a desire to increase the power output at a faster rate or in the case of a supercharged system 11 with an HRSG system 15, by the amount of air required to purge the HRSG system 15. Other factors such as compressor fan limitations, fan operability levels (surge line), whether the gas turbine system is operating at its start cycle may determine the first portion of the airstream to be provided to the compressor. The first portion may also be a function of uses for the second portion. For example if the gas turbine system 13 is part of a supercharge combined cycle system 11 having an HRSG system with duct combustion then the second portion may be determined on the basis of the oxygen level desired for the duct combustion, thereby determining the first portion. The method may determine if the system includes an HRSG system 15 (method element 87). If the supercharged system 11 does not include an HRSG system 15 the method 81 may determine a second portion of air stream to be provided to other uses (method element 89). The method may control the air stream to provide the first portion of the air stream to the compressor 21 and second portion to the other uses (method element 91). The method may also control the temperature of the first portion of the air stream (method element 92). If the supercharged system 11 includes an HRSG system 15, the method 81 may determine a second portion of the airstream to be provided to the HRSG system 15 (method element 93). The method may control the air stream to provide the first portion of the air stream to the compressor 21 and second portion to the HRSG system 15 (method element 95). The method may also control the temperature of the first portion of the air stream (method element 97).

More specifically, the supercharged system 11 provides for a method of augmenting the power produced. The greater mass flow-rate provided by the fan assembly 39 provides more oxygen to support combustion than would be available if gas turbine system 13 were naturally aspirated. This in turn allows more fuel to be burned and more work to be done per cycle, increasing the power output of the gas turbine system 13. The increase in fuel input chemical energy increases both the gas turbine shaft power output and exhaust energy.

The supercharged system 11 allows a power plant to have higher rated power output capacity at higher ambient temperatures and/or lower atmospheric pressures without exceeding equipment material limitations with a relatively small capital investment. This allows a power plant to have higher rated power output capacity without exceeding equipment material limitations and with a relatively small capital investment. Performance of a gas turbine system 13 is dependent on the inlet air temperature. The power output of a gas turbine depends on the flow of mass through it. On hot days, when air is less dense, power output would typically decrease.

The ability to divert some of the discharge air stream from the fan assembly 39 allows the fan 41 to be mechanically driven by the shaft 27 directly by the gas turbine system 13, avoiding stalling events during acceleration and loading, while also controlling fan discharge pressure to avoid overloading the gas turbine beyond controlled operational limits.

The air bypassing the gas turbine system 13 into the exhaust during start-up can be used to load the gas turbine power faster, because the bypassed air effectively lowers gas turbine exhaust temperature reducing thermal strain on both heat recovery and steam cycle equipment. Additionally, bypassing air into the HRSG system 15 will results with a shorter purge time for HRSG system 15 during the start sequence of the gas turbine system 13. The bypassed air can also increases the oxygen content in the exhaust gas stream which allows for additional/extended supplementary firing. The air stream provided by the fan assembly 39 may also be exported and used for other blower services such as compartment ventilation, plant HVAC and other cooling/sealing air services.

Driving the fan assembly 39 directly by the shaft 27 of the gas turbine system 13 reduces the actual power output of the electrical generator (generator and/or mechanical load 29) which allows for a higher level of supercharging relative to the generator cooling limit at a given ambient condition. This is different from supercharging with an independent fan (i.e. not mechanically coupled to the shaft 27, such as for example one driven by an electric motor). An independent fan would need a separate source of power. Increasing the power output at high ambient temperatures is typically limited by the cooling capacity of generator 29. By mechanically coupling the fan 41 to the shaft 27 a higher level of supercharging may be achieved without exceeding the capacity of generator 29.

The supercharged system 11 provides a number of advantages. Technically, the supercharging system shifts and increases the base load capacity of the gas turbine. The supercharger and bypass system 17 allows the fan 41 to be continuously running at a fixed speed in tandem with the gas turbine system 13 under all operating points instead of using some form of variable speed drive. A variable speed drive is likely to be more costly and complex, but may yield better plant efficiency. Additionally, the mechanically coupled fan assembly 39 does not have the operational complexities of large electric motor driven superchargers; where starting and stopping the motor in coordination with the gas turbine system 13 controller could become problematic due to the switch over surge or depressurization while the gas turbine system 13 is in operation. The supercharged system 11 does not have electrical losses associated with motor driven equipment.

Commercially, the supercharged system 11 may operate with fewer gas turbine systems 13 to achieve a desired electrical output capacity for a large scale power generation facility with a design (rating) point at high ambient temperature and/or low atmospheric pressure. This is particularly beneficial for applications with lower cost fuel sources and/or for limited seasonal operation at peak electrical demands.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed:

1. A supercharging system for a gas turbine system having in series a compressor, a combustor, a turbine and a heat recovery steam generator comprising:
   a fan assembly, mechanically coupled to the turbine, that provides an air stream output;
   a cooling subsystem configured to control temperature and volumetric flow rates into the compressor, and for conveying a first portion of the air stream output to the compressor; and
   a bypass subsystem comprising a variable geometry diverter for selectively bypassing the cooling subsystem by diverting a second portion of the air stream output uninterruptedly to the heat recovery steam generator for increased steam production in the heat recovery steam generator.

2. The supercharging system of claim 1 further comprising a control system that controls the bypass subsystem.

3. The supercharging system of claim 1 wherein the cooling subsystem comprises an air cooling assembly disposed between the fan assembly and the compressor.

4. The supercharging system of claim 2 wherein the control system comprises a supercharger controller.

5. The supercharging system of claim 4 wherein the supercharger controller controls the second portion of the air stream output.

6. A gas turbine system comprising:
   a compressor;
   a combustor coupled to the compressor;
   a turbine coupled to the combustor;
   a shaft coupled to the turbine;
   a heat recovery steam generator coupled to the turbine;
   a fan mechanically coupled to the shaft, the fan generating an air stream;
   a cooling subsystem configured to control temperature and volumetric flow rates into the compressor; and
   a bypass subsystem comprising a variable geometry diverter that selectively allocates the air stream between a first portion to the compressor via the cooling subsystem and a second portion to the heat recovery steam generator, and wherein the variable geometry diverter is disposed directly between the fan and the heat recovery steam generator such that the bypass subsystem uninterruptedly conveys the second portion of the air stream output from the variable geometry diverter to the heat recovery steam generator for increased steam production in the heat recovery steam generator.

7. The gas turbine system of claim 6 wherein the cooling subsystem is an air cooling system disposed between the fan and the compressor.

8. The gas turbine system of claim 6 wherein the fan is mechanically coupled to the shaft through a gear mechanism.

9. The gas turbine system of claim 6 wherein the variable geometry diverter comprises a conduit and a damper.

10. The gas turbine system of claim 6 wherein the fan comprises a variable pitch blade.

11. The gas turbine system of claim 6 further comprising a control system that controls the bypass subsystem.

* * * * *